Jan. 29, 1924.
P. FERRIER
1,482,074
MEANS FOR PROTECTING THE SPRINGS OF MOTOR CARS AND OTHER VEHICLES
Filed Sept. 2, 1921
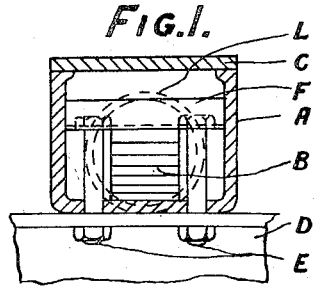
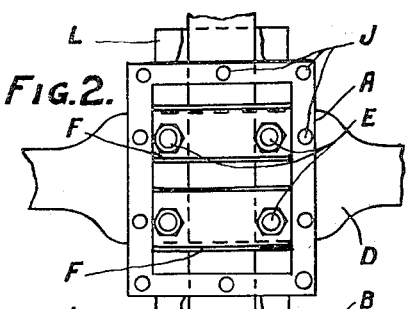
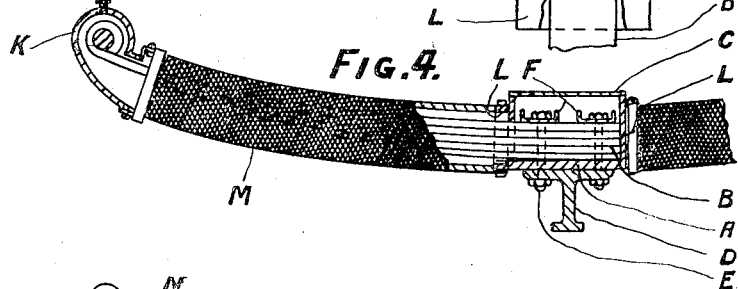
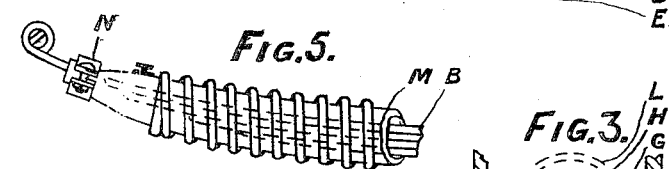
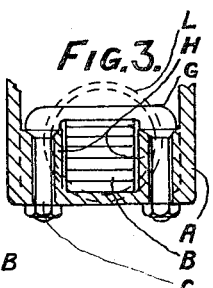
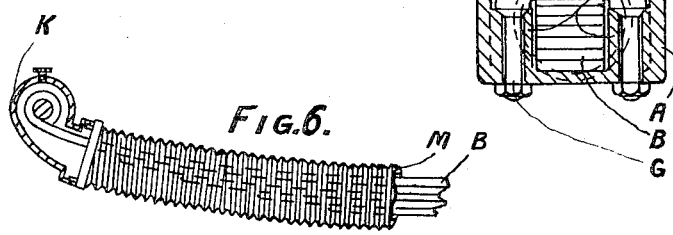
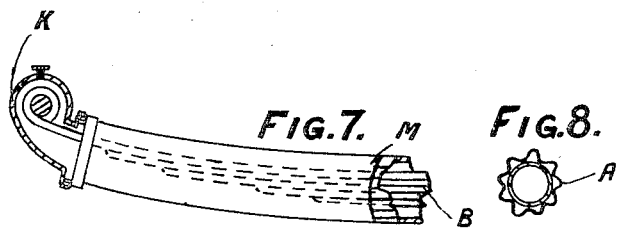
Inventor
P. Ferrier,
By Marks&Clerk
Attys.

Patented Jan. 29, 1924.

1,482,074

UNITED STATES PATENT OFFICE.

PETER FERRIER, OF BRISBANE, QUEENSLAND, AUSTRALIA.

MEANS FOR PROTECTING THE SPRINGS OF MOTOR CARS AND OTHER VEHICLES.

Application filed September 2, 1921. Serial No. 497,838.

*To all whom it may concern:*

Be it known that I, PETER FERRIER, subject of the King of Great Britain, residing at Brisbane, Queensland, Australia, have invented certain new and useful Improvements in Means for Protecting the Springs of Motor Cars and Other Vehicles, of which the following is a specification.

This invention has for its object the production of a cover or envelope for the springs of motor cars and other vehicles, so that such springs can always be bathed in oil or other lubricant, and thus have its life prolonged. The use of the invention also prevents dust getting to the spring.

In carrying out my invention I provide a suitable casing for the centre and ends of the springs, the springs between such casings being enveloped in a flexible covering.

In order that my invention may be better understood, I will now describe it with the aid of the accompanying drawings, in which—

Fig. 1 is a sectional view showing a casing for securing the spring and covering.

Fig. 2 is a plan of same (cover removed).

Fig. 3 is a sectional view showing an alternative method of securing the casing and spring.

Figs. 4, 5, 6, 7, and 8 show alternative forms of covering.

The casing consists of the body A, through which the spring B passes, and a cover C. The body A and spring B are secured to the axle D by the bolts E and clips F, an oil tight joint being made where the bolts E pass through the body A (see Figs. 1 and 2), such as by screwing the bolts through the casing A, or providing suitable washers. Or, the body A and spring B may be secured to the axle D by U bolts G and nuts, the legs of which pass through bosses or sleeves H on the inside of the body A, the upper part of the legs being coned so that an oil tight joint may be made. The bosses or sleeves H are not quite as high as the spring B.

The cover C is secured to the body A by studs and nuts J or screws.

The body A of the centre casing and the end casing K has flanges L, to which the ends of the envelope M, which covers the spring B, are secured, as by clamps, brazing, screwing, or otherwise. Suitable cushioning may be provided between the end casing K and the spring B to prevent rattling. The cushioning may be in the form of spiral or other springs, felt, leather, or other buffers.

The envelope M may be of round, oval, or other transverse section. It may be of any suitable flexible material without or with longitudinal joint, according to the material, such as woven tubing, corrugated metal tubing (the corrugations being arranged lengthwise), oil proof rubber, leather (whether ordinary tanned, mineralized, or otherwise treated), canvas, vulcanite, bakelite, or other like material, either separately or in combination of either two or more of the substances. The tubing may be reinforced with spiral wire on the inside, on the outside, or embedded in the material, or on both the inside and outside. Woven wire tubing is shown in Fig. 4; reinforced tubing of canvas or other material is shown in Fig. 5; and corrugated metal is shown in Fig. 6. In Fig. 5 the end of the envelope M is secured to the spring B by a clip N.

Figs. 7 and 8 show an alternative arrangement wherein the centre casing A C, is dispensed with, the envelope M being corrugated circumferentially in the centre, so that it may be compressed when the spring B is secured to the axle D. Or a short tube may be used in the same manner, having the envelope M secured to it, as in the casing A C.

It is to be understood that the cover M is made in the form of an oil tight sleeve, which may be slipped over the end of the spring B. When of leather or other like material, the edges would be sewn or otherwise secured together.

The details of carrying my invention into effect may be varied as found desirable, according to the design of the vehicle to which it is applied.

Having now particularly described and ascertained the nature of my said invention and in what manner the same is to be performed, I declare that what I claim is:—

A protecting casing for the springs of motor cars and other vehicles including in combination with a stationary part of the car and a leaf spring traversing said car of an open ended metallic section disposed on the stationary part of the vehicle for receiving the spring, integral sleeves formed within and on opposite sides of the casing and provided at the upper ends with seats, U-bolts having their medial portions engaging the upper part of the spring and having their shanks opposed to the upper sleeve portions and provided with conical portions engaging the seats to provide oil tight joints therebetween, means for adjustably clamping the bolts and maintaining the spring and the casing in position, a cover removably arranged on the casing, other metallic sections enveloping the ends of the spring and flexible sections enveloping the side portions of the spring and secured to the open ended medial section and the end section.

In testimony whereof I affix my signature in the presence of two witnesses.

PETER FERRIER.

Witnesses:
 MABEL C. LOW,
 ALEXANDER ANDERSON.